US009143906B2

(12) United States Patent
Ludwig et al.

(10) Patent No.: US 9,143,906 B2
(45) Date of Patent: Sep. 22, 2015

(54) PREMIUM MESSAGING CHALLENGES

(71) Applicant: Google Inc., Mountain View, CA (US)

(72) Inventors: Adrian Ludwig, Atherton, CA (US); Robert J. Greenwalt, III, Redwood City, CA (US); Winthrop Lyon Saville, III, Soquel, CA (US); Nicholas Neil Kralevich, IV, Sunnyvale, CA (US); Jake Hamby, Mountain View, CA (US); Randall Sarafa, San Francisco, CA (US); Alexander Faaborg, Mountain View, CA (US)

(73) Assignee: Google Inc., Mountain View, CA (US)

( * ) Notice: Subject to any disclaimer, the term of this patent is extended or adjusted under 35 U.S.C. 154(b) by 156 days.

(21) Appl. No.: 13/934,176

(22) Filed: Jul. 2, 2013

(65) Prior Publication Data

US 2014/0274172 A1 Sep. 18, 2014

Related U.S. Application Data

(60) Provisional application No. 61/798,189, filed on Mar. 15, 2013.

(51) Int. Cl.
*H04W 4/00* (2009.01)
*H04W 4/14* (2009.01)
*H04L 12/58* (2006.01)
*H04W 4/24* (2009.01)
*H04M 1/725* (2006.01)
*H04M 11/00* (2006.01)

(52) U.S. Cl.
CPC .................. *H04W 4/14* (2013.01); *H04L 51/00* (2013.01); *H04L 51/38* (2013.01); *H04M 1/72552* (2013.01); *H04W 4/24* (2013.01); *H04M 1/72577* (2013.01); *H04M 2250/10* (2013.01)

(58) Field of Classification Search
CPC ....... H04L 51/04; H04L 51/36; H04L 12/585; H04L 12/5875; H04L 51/12; H04L 51/30; H04L 12/5895; H04M 15/47; H04M 2215/0148; H04M 2215/81; H04M 2215/815; H04M 2215/28; H04W 4/24; H04W 4/14; H04W 88/184
USPC ........................................................ 455/466
See application file for complete search history.

(56) References Cited

U.S. PATENT DOCUMENTS 6,819,932 B2 11/2004 Allison et al.
8,014,800 B2 9/2011 Tornkvist
8,160,545 B2 4/2012 D'Englere
(Continued)

OTHER PUBLICATIONS

International Search Report and Written Opinion of international application No. PCT/US2014/013422, mailed Aug. 19, 2014, 16 pp.

*Primary Examiner* — Timothy Pham
(74) *Attorney, Agent, or Firm* — Shumaker & Sieffert, P.A.

(57) ABSTRACT

A device includes at least one processor, a messaging service operable by the at least one processor to determine whether an outgoing message is a likely premium message, and a user interface module operable by the at least one processor to responsive to determining that outgoing message is the likely premium message, output, for display, a prompt for confirmation to send the outgoing message to a likely premium code, and receive an indication of input detected within the prompt for confirmation. The module is further operable by the at least one processor to selectively send, based at least in part on the received indication of the user input, the outgoing message to the likely premium code.

21 Claims, 4 Drawing Sheets

(56) References Cited

U.S. PATENT DOCUMENTS

| | | |
|---|---|---|
| 2005/0114533 A1 | 5/2005 | Hullfish et al. |
| 2006/0031328 A1 | 2/2006 | Malik |
| 2010/0167707 A1* | 7/2010 | Thorson et al. ............ 455/414.2 |
| 2014/0179360 A1* | 6/2014 | Jackson et al. ................ 455/466 |

* cited by examiner

PREMIUM MESSAGING CHALLENGES

RELATED APPLICATION

This application claims the benefit of U.S. Provisional Application No. 61/798,189, filed Mar. 15, 2013, the entire content of which is incorporated herein by reference.

BACKGROUND

Computing devices can perform various functions, such as executing applications stored at the computing device and outputting information (e.g., documents, e-mails, and pictures) for display (e.g., on a screen). Certain computing devices can include messaging functionality, such as short messaging service (SMS) functionality. When sending an SMS message, the message may be directed to a phone number, code, or other destination associated with either premium or a non-premium SMS service. In general, a premium SMS service is associated with a charge to the message sender that is paid to the premium SMS recipient in addition to any charges to send the message itself. In contrast, a sender of a message to a non-premium SMS service does not incur any additional charges other than for sending the message itself.

Premium short messaging service (SMS) messages may be used to collect money for charities, foundations, and other valid groups. However, an application provider who is able to install malicious applications on mobile computing devices may also use premium SMS messages to collect money. The malicious applications can be configured to automatically send an SMS message to a specific short code that is associated with a "donation" to the application provider's bank account. Typically, the user of the mobile computing device is unaware of the outgoing premium SMS message until the charge for the "donation" appears on the user's phone bill.

SUMMARY

In one example, a method includes determining, by a computing device, whether an outgoing message is a likely premium message, and, responsive to determining that outgoing message is the likely premium message, outputting, by the computing device and for display, a prompt for confirmation to send the outgoing message. The method may also include receiving, by the computing device, an indication of input detected within the prompt for confirmation, and selectively sending, by the computing device and based at least in part on the received indication of the user input, the outgoing message to the likely premium SMS short code.

In another example, a device includes at least one processor, a messaging service module operable by the at least one processor to determine whether an outgoing message is a likely premium message, and a user interface module operable by the at least one processor to responsive to determining that outgoing message is the likely premium message, output, for display, a prompt for confirmation to send the outgoing message to a likely premium code, and receive an indication of input detected within the prompt for confirmation. The messaging service module is further operable by the at least one processor to selectively send, based at least in part on the received indication of the user input, the outgoing message to the likely premium code.

In another example, a computer-readable storage medium is encoded with instructions. The instructions cause one or more programmable processors of a computing device to determine whether a an outgoing message is a likely premium message, responsive to determining that outgoing message is the likely premium message, output, for display, a prompt for confirmation to send the outgoing message to a likely premium code, receive an indication of input detected within the prompt for confirmation, and selectively send, based at least in part on the received indication of the user input, the outgoing message to the likely premium code.

The details of one or more embodiments are set forth in the accompanying drawings and the description below. Other features, objects, and advantages will be apparent from the description and drawings, and from the claims.

DETAILED DESCRIPTION

Examples described in this disclosure relate to techniques implemented by a computing device that sends and receives messages. In some implementations, the messages are short messaging service (SMS) message. The computing device may analyze the destination of the SMS message prior to sending the SMS message to determine the phone number or short code to which the SMS message is going to be sent. If the computing device determines that the destination for the SMS message is a short code that corresponds to a likely premium SMS short code, the computing device may temporarily prevent the SMS message from being sent. In some instances, the computing device may cause a dialog box to be output at a display device. The dialog box may include an indication that the SMS message is directed to a likely premium SMS short code and provide a user of the computing device options as to how the computing device should process the SMS message. For example, the dialog box may include options to allow the SMS message to be sent to the likely premium SMS short code, discard the SMS message such that it is never sent, and report a malicious application to a third party for possible removal from an application repository. In this manner, techniques of this disclosure may enable a computing device to request confirmation from a user before sending an SMS message to a likely SMS premium short code, thereby enabling users to avoid incurring undesired charges associated with the premium SMS short codes.

Figure 1:
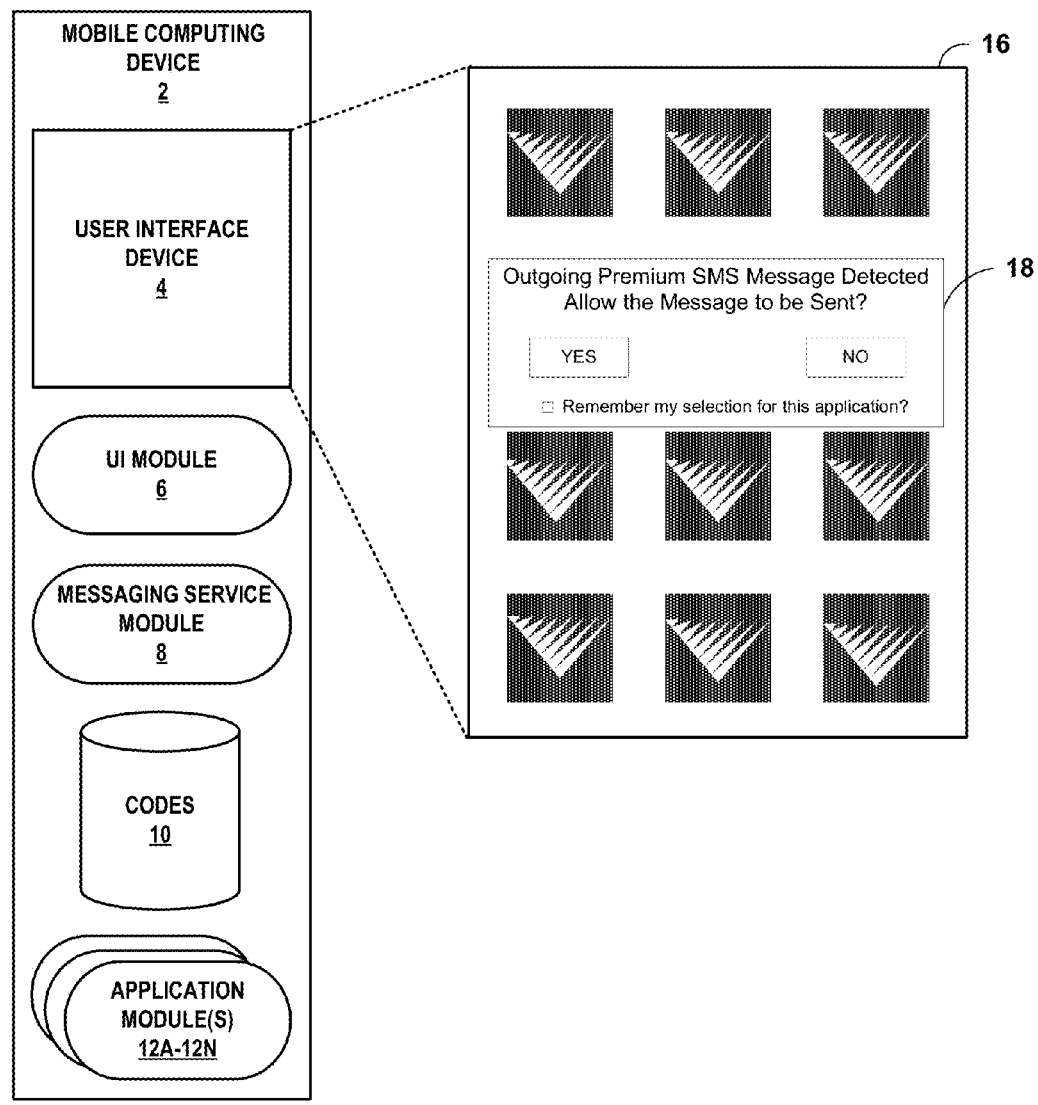
FIG. 1 is a conceptual diagram illustrating an example computing device that is configured to intercept and selectively send premium SMS messages.

FIG. 1 is a conceptual diagram illustrating an example computing device that is configured to intercept and selectively send premium SMS messages. In some examples, computing device 2 may be associated with a user that may interact with the computing device by providing various user inputs into the computing device.

Examples of computing device 2 may include, but are not limited to, portable or mobile devices such as mobile phones (including smart phones), laptop computers, desktop computers, tablet computers, smart television platforms, cameras, personal digital assistants (PDAs), servers, mainframes, etc. As shown in the example of FIG. 1, computing device 2 may be a tablet computer. Computing device 2, in some examples, may include user interface (UI) device 4, UI module 6, messaging service module 8, codes 10, and one or more application modules 12A-12N (collectively, "application modules 12"). Other examples of computing device 2 that implement techniques of this disclosure may include additional components not shown in FIG. 1.

Computing device 2 may include UI device 4. In some examples, UI device 4 may be configured to receive tactile, audio, or visual input. UI device 4, as shown in FIG. 1, may include a touch-sensitive and/or presence-sensitive display or any other type of device for receiving input. UI device 4 may output content such as graphical user interface (GUI) 16 for display. In the example of FIG. 1, UI device 4 may be a presence-sensitive display that may display a graphical user interface and receive input from user 18 using capacitive, inductive, and/or optical detection at or near the presence-sensitive display.

As shown in FIG. 1, computing device 2 may include UI module 6. UI module 6 may perform one or more functions to receive input, such as user input, and send such input to other components associated with computing device 2, such as messaging service module 8. For example, UI module 6 may determine a gesture performed by user 18 at UI device 4. UI module 6 may also receive data from components associated with computing device 2, such as messaging service module 8. Using the data, UI module 6 may cause other components associated with computing device 2, such as UI device 4, to provide output based on the data. For instance, UI module 6 may receive data from messaging service module 8 that causes UI device 4 to display information within GUI 16. As shown in FIG. 1, GUI 16 may be a user interface generated by UI module 6 that allows a user to interact with computing device 2. GUI 16 may include graphical content. Graphical content, generally, may include text, images, a group of moving images, etc. As shown in FIG. 1, graphical content may include notification 18. Notification 18 includes an indication that an SMS message is directed to a short code determined to likely correspond to a premium SMS service.

UI module 6 may be implemented in various ways. For example, UI module 6 may be implemented as a downloadable or pre-installed application or "app." In another example, UI module 6 may be implemented as part of a hardware unit of computing device 2. In another example, UI module 6 may be implemented as part of an operating system of computing device 2. In some instances, portions of the functionality of UI module 6 or any other module described in this disclosure may be implemented across any combination of an application, hardware unit, and operating system.

As shown in FIG. 1, computing device 2 may include one or more application modules 12A-12N (collectively, "application modules 12"). Application modules 12 may include functionality to perform various operations on computing device 2. For instance, application modules 12 may include functionality to generate and actively-update the content of widgets. In some examples, application modules 12 may send data to and/or receive data from messaging service module 8. A user may selectively install applications on computing device 2 (e.g., from an online application store, website, etc.). In some instances, the user may install a malicious application that includes undesired functionality. For example, an application developer or company may provide the malicious application to causes computing device 2 to perform operations not desired by the user. As one example, the malicious application may cause computing device 2 to generate and send SMS messages to a premium SMS short code that is associated with a monetary transfer to the malicious application developer, thereby causing the user to incur undesired monetary charges.

Computing device 2 may include messaging service module 8 and codes 10. Messaging service module 8 may perform one or more functions to generate and selectively send SMS messages. In some implementations, messaging service module 8 may be referred to as an "SMS dispatcher." Messaging service module 8 may be implemented in various ways. For example, messaging service module 8 may be implemented as a downloadable or pre-installed application. In another example, messaging service module 8 may be implemented as part of a hardware unit of computing device 2. In another example, messaging service module 8 may be implemented as part of an operating system of computing device 2.

Codes 10 is one example of a data repository that may be configured to store information about one or more SMS short codes, including whether an SMS short code is likely a premium SMS short code and a country associated with each SMS short code. Codes 10 may store data in the form of one or more tables, databases, linked lists, radix trees, or other suitable data structure. SMS short codes may be special telephone numbers that are typically shorter than traditional telephone numbers. SMS short codes may vary from country to country both in format and content. In general, each country maintains its own set of short codes and sets its own rules for the short codes, such as the length of the short codes, restricting certain short codes or portions of short codes to particular uses, etc. Thus, when determining if a short code is a likely premium SMS short code, it may be important to consider the country in which computing device 2 is physically located at the time the SMS message is queued for sending.

In one example operation, messaging service module 8 may receive data, instructions, or other information from one or more of applications 12 (e.g., application 12A) that directs messaging service module 8 to generate an SMS message. The SMS message generated by messaging service module 8 may include a portion of the information received from application 12A. In another example operation, application 12A may send a generated SMS message to messaging service module 8 for sending. In some examples, messaging service module 8 may be configured to analyze the information received from application 12A and/or the generated SMS message to determine the destination of the SMS message. The destination may include a traditional phone number or an SMS short code, as non-limiting examples. If the destination includes a traditional phone number or is not an SMS short code, messaging service module 8 may be configured to allow the generated SMS message to be sent to the destination without prompting the user.

In instances where the destination includes an SMS short code, messaging service module 8 may determine a current location (e.g., country, region, etc.) of computing device 2. For example, messaging service module 8 may access country information stored in a subscriber identity module (SIM) card of computing device 2. In another example, computing device 2 may use a global positioning system (GPS) device to obtain latitude and longitude coordinates of computing device 2. In another example, computing device 2 may derive its position using one or more network access points (e.g., wireless towers or local area network access devices) to which computing device 2 is connected. In some examples, computing device 2 may triangulate its approximate position from multiple cellular towers. In another example, computing device 2 may determine its respective position by recognizing other computing devices using short-range communication or other communication protocols.

Responsive to determining the location of computing device 2, messaging service module 8 may retrieve, receive, or otherwise access data stored in codes 10 based on the determined location of computing device 2. Messaging service module 8 may compare the destination SMS short code of the SMS message to the retrieved SMS short codes to determine if the destination SMS short code is a likely premium SMS short code. For example, if information about premium SMS short codes is stored in codes 10, messaging service module 8 may identify the destination short code as a likely SMS short code if the destination short code matches one of the retrieved short codes. If messaging service module 8 determines that the destination short code corresponds to a likely premium SMS short code, messaging service module 8 may cause UI module 6 to modify the contents of GUI 16 to include notification window 18.

Notification window 18 is one example of a graphical element that may be generated and output to notify a user that the SMS message about to be sent has a destination that is determined to correspond to a likely premium SMS short code. As shown in FIG. 1, notification window 18 includes a message that may alert a user of the outgoing SMS message, two buttons that may enable the user to select whether to allow the SMS message to be sent, and a checkbox with corresponding text that may enable the user to configure whether UI module 6 outputs notification window 18 again the next time the same application attempts to send an SMS message to the same destination short code. That is, if the user configures computing device 2 to remember the selection, computing device 2 may be configured to always allow or always deny SMS messages originated by application 12A that have a destination SMS short code associated with a likely premium SMS short code.

In some examples, if the user does not allow computing device 2 to send the SMS message to the likely premium SMS short code, messaging service module 8 may be configured to determine that the one of applications 12 that generated the SMS message is a potential malicious application. In these examples, messaging service module 8 may cause computing device 2 to notify an application service provider of the potentially malicious application. Typically, computing device 2 may notify the application service provider that hosted the application store from which computing device 2 downloaded the potentially malicious application. Responsive to receiving the notification, the application service provider may contact the application developer responsible for the possibly malicious application, remove the potentially malicious application from the application store, cause the potentially malicious application to be removed from other computing devices on which is was installed, or take other actions mitigate the distribution of by the potentially malicious application and the harm caused by the potentially malicious application.

In this manner, techniques of this disclosure may enable a computing device to alert a user of a mobile computing device of a possible premium SMS message being generated and attempting to be sent from the mobile computing device. By alerting the user, the user may avoid incurring financial costs associated with the premium SMS message. Moreover, in instances where the premium SMS message is generated by a malicious application, techniques of this disclosure may enable the malicious application to be reported by the user and possibly removed from an application corpus, reducing the spread of the malicious application and reducing the amount of illegitimate financial costs incurred by users having mobile computing devices on which the malicious application is installed.

Figure 2:
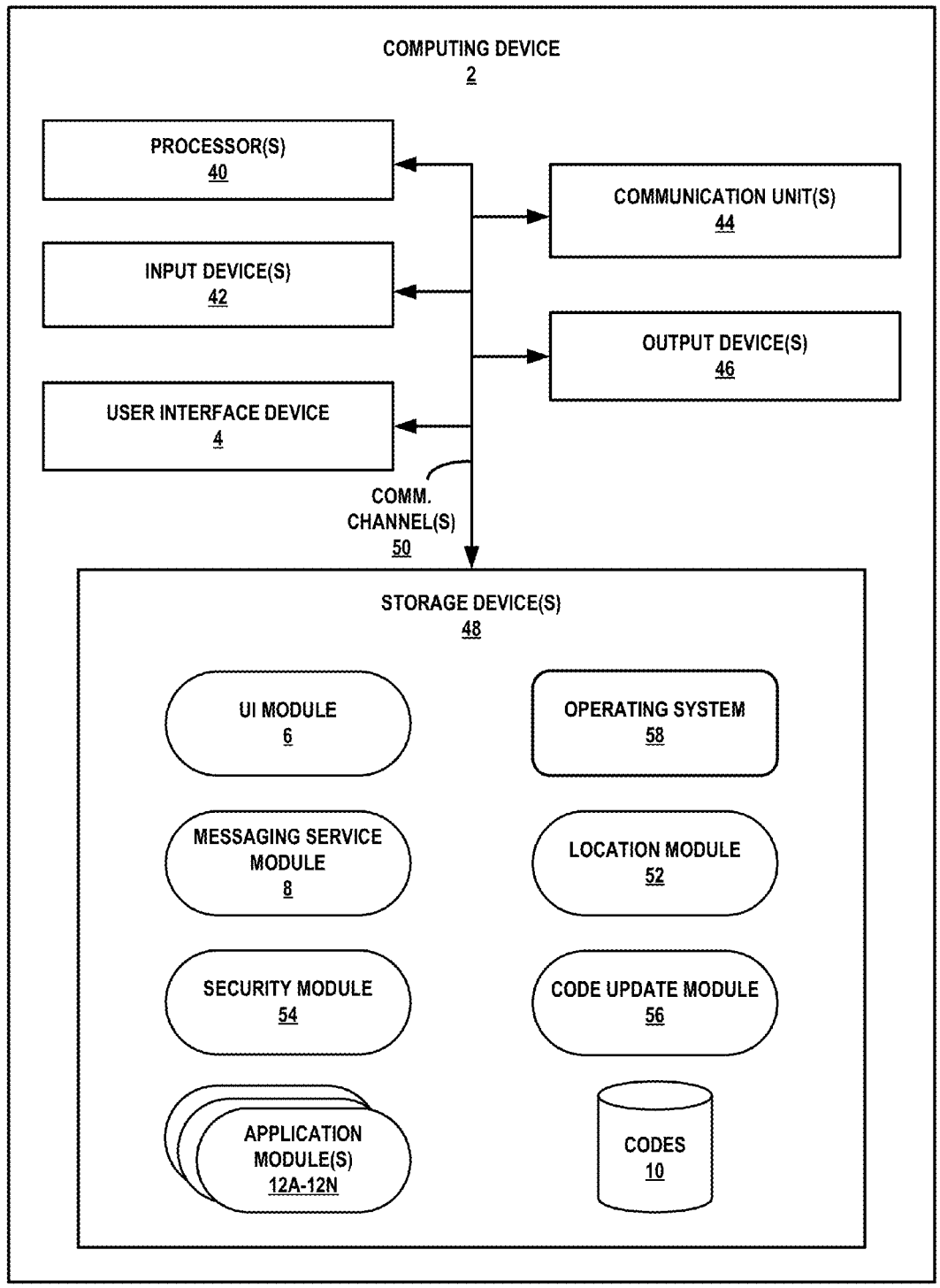
FIG. 2 is a block diagram illustrating an example computing device, in accordance with one or more aspects of the present disclosure.

FIG. 2 is a block diagram illustrating an example computing device, in accordance with one or more aspects of the present disclosure. FIG. 2 illustrates only one particular example of computing device 2, and many other examples of computing device 2 may be used in other instances. Moreover, although shown in FIGS. 1 and 2 as a stand-alone computing device 2 for purposes of example, a computing device may be any set of components or system that includes one or more processors 40 or other suitable computing environment for executing software instructions.

As shown in the specific example of FIG. 2, computing device 2 may provide an execution environment for executable software instructions. In this example, computing device 2 includes UI device 4, one or more processors 40, one or more input devices 42, one or more communication units 44, one or more output devices 46, and one or more storage devices 48. Each of components 4, 40, 42, 44, 46 and 48 may be interconnected (physically, communicatively, and/or operatively) by one or more communication channel(s) 50 for inter-component communications. In some examples, communication channel(s) 50 may include one or more system buses, network connections, inter-process communication data structures, or other channels for communicating data.

Processor(s) 40, in some examples, are configured to implement functionality and/or execute instructions. For example, processor(s) 40 may be capable of processing instructions stored in storage device(s) 48. Examples of processor(s) 40 may include, one or more of a microprocessor, a controller, a digital signal processor (DSP), an application-specific integrated circuit (ASIC), a field-programmable gate array (FPGA), or other type of discrete or integrated logic circuitry.

Storage device(s) 48 may be configured to store program code and/or data for use within computing device 2. In the example of FIG. 2, storage device(s) 48 may store software components including operating system 58, UI module 6, input module 8, user management module 10, application modules 12A-12N, location module 52, security module 54, and code update module 56. Storage device(s) 48, in some examples, are described as computer-readable storage media. In some examples, storage device(s) 48 include temporary memory, meaning that primary purposes of storage devices 48 are not long-term storage. Storage device(s) 48, in some examples, include volatile memory, meaning that storage device(s) 48 do not maintain stored contents when computing device 2 is turned off. Examples of volatile memories may include random access memories (RAM), dynamic random access memories (DRAM), static random access memories (SRAM), and other forms of volatile memories known in the art. In some examples, storage device(s) 48 are used to store program instructions for execution by processor(s) 40. Storage device(s) 48, in some examples, are used by programs or applications running on computing device 2 (e.g., application modules 12) to temporarily store information during program execution.

Storage device(s) 48, in some examples, comprise one or more computer-readable storage media. Storage device(s) 48 may be configured to store larger amounts of information than volatile memory. Storage device(s) 48 may further be configured for long-term storage of information. In some examples, storage device(s) 48 include non-volatile storage elements. Examples of such non-volatile storage elements include magnetic hard discs, optical discs, floppy discs, flash memories, or forms of electrically programmable memories (EPROM) or electrically-erasable and programmable (EEPROM) memories.

Computing device 2 may use communication unit(s) 44 to communicate with external devices via one or more communication networks, such as one or more wireless networks. Communication unit(s) 44 may include one or more network interface cards, such as Ethernet cards, optical transceivers, radio frequency transceivers, or other types of devices that are configured to send and receive information. Other examples of network interfaces may include Bluetooth radios, 3G radios, and WiFi radios, as well as Universal Serial Bus (USB) interfaces. In some examples, computing device 2 may use communication unit(s) 44 to wirelessly communicate with another computing device that is operably coupled to computing device 2.

Input device(s) 42 may be configured to receive, from a user, input through tactile, audio, or video feedback. Examples of input device(s) 42 may include presence-sensitive displays, mice, keyboards, voice responsive systems, video cameras, microphones or other types of devices for detecting input from a user. In some examples, a presence-sensitive display includes a touch-sensitive screen.

Output device(s) 46 may provide output to a user using tactile, audio, or video stimuli. Example types of output device(s) 46 may include sound cards, video graphics adapter cards, optical projectors, presence-sensitive displays, or other types of devices for converting a signal into an appropriate form understandable to humans or machines. Additional examples of output device(s) 46 may include speakers, cathode ray tube (CRT) monitors, liquid crystal displays (LCDs), or other types of devices that can generate intelligible output to a user.

Operating system 58 may control the operation of components of computing device 2. For example, operating system 58 may facilitate communication between UI module 6, messaging service module 8, location module 52, security module 54, code update module 56, and processors 40, communication units 44, storage devices 48, input devices 42, and output devices 46. One or more components of storage devices 48, including operating system 58, UI module 6, messaging service module 8, location module 52, security module 54, code update module 56, and application modules 12, may each include program instructions and/or data that may be executable by computing device 2. Messaging service module 8, location module 52, security module 54, and code update module 56 may each include instructions that cause computing device 2 to perform one or more of the operations and actions described in the present disclosure. In some examples, one or more of the components illustrated in storage device(s) 48 may be implemented in hardware and/or a combination of software and hardware.

In accordance with the techniques of this disclosure, computing device 2 may alert a user of computing device 2 of a possible premium SMS message being generated and attempting to be sent from computing device 2. That is, computing device 2 may intercept outgoing SMS messages determined to be likely premium SMS message and request confirmation that the outgoing SMS messages should be sent. One or more of application modules 12 may generate an indication of an SMS message and provide the indication of the SMS message to messaging service module 8. In some instances, the indication of the SMS message may include content of an SMS message (e.g., textual and/or graphical information), a command to generate an SMS message, and/or a destination address (e.g., a telephone number) for the SMS message.

In response to receiving the indication of the SMS message, messaging service module 8 may analyze all or a portion of the received indication to determine if the SMS message is a likely premium SMS message. In some examples, messaging service module 8 identifies a current location of computing device 2 in order to determine which destinations (e.g., telephone numbers, SMS codes, etc.) may be associated with likely premium SMS messages. Messaging service module 8 may access country information stored in a subscriber identity module (SIM) card of computing device 2. Alternatively or in addition, messaging service module 8 may request location information from location module 52. Responsive to receiving the request, location module 52 may determine the current location of computing device 2 by, for example, using a global positioning system (GPS) device to obtain latitude and longitude coordinates of computing device 2. In another example, location module 52 may determine the current location of computing device 2 using one or more network access points (e.g., wireless towers or local area network access devices) to which computing device 2 is connected. In some examples, location module 52 may approximate the current position of computing device 2 by, for example, triangulating the location of computing device 2 from multiple cellular towers. In another example, location module 52 may determine the current location of computing device by recognizing other computing devices using short-range communication or other communication protocols.

Responsive to receiving the location information, messaging service module 8 may retrieve, receive, or otherwise access data stored in codes 10 based on the determined location of computing device 2. In some examples, codes 10 includes one or more SMS message destinations identified as being associated with likely premium SMS codes (e.g., a "blacklist" of SMS codes). In other examples, codes 10 is configured to store SMS codes determined not to be premium SMS codes (e.g., a "whitelist" of SMS codes). Codes 10 may also include geographic information (e.g., country, city, state, region, etc.) and a confidence level for each destination, the confidence level being indicative of how likely the particular destination is a premium SMS destination. For example, if a service that manages likely premium SMS destinations determines that every SMS message sent to the SMS code "00000" is a premium SMS message, but that only a portion of the SMS messages sent to the SMS code "11111" are premium SMS messages, the service may determine that "00000" is a premium SMS code with a high degree of confidence and determine that "11111" is a premium SMS code with a low degree of confidence.

From time to time the destinations associated with likely premium SMS messages may change. Code update module 56 may receive updated information (e.g., from a user of computing device 2, from a security service provider, etc.). The updated information may include updated destination information as well as updated confidence level information and geographic information.

Messaging service module 8 may select a portion of SMS codes stored in codes 10 based on the location information received from location module 52. For example, messaging service module 8 may determine that computing device 2 is located within the United States and retrieve the SMS codes associated with the United States from codes 10. Based on the retrieved SMS codes, messaging service module 8 may determine if the destination SMS code for the outgoing SMS message corresponds to a likely premium SMS code.

In various instances, if the confidence level associated with the destination SMS code is very high (e.g., the destination SMS code is definitely a premium SMS code), messaging service module 8 may generate a different prompt for the user than if the confidence level associated with the destination SMS code is low. For example, if the confidence level is very high, messaging service module 8 may cause UI module 6 to output a prompt that indicates that the destination SMS code is a premium SMS code. In contrast, if the confidence level is low, messaging service module 8 may cause UI module 6 to output a prompt that indicates that the destination SMS code may be a premium SMS code. If messaging service module 8 determines that the destination SMS code is not associated with a premium SMS code, messaging service module 8 may send the outgoing SMS message without causing UI module 6 to output a prompt requesting confirmation to send the outgoing SMS message.

In instances where the outgoing SMS message is determined to be a likely premium SMS message (i.e., the destination is associated with a likely premium SMS code), UI module 6 may output a visual indication (e.g., a notification, pop-up window, alert, etc.) that indicates that the outgoing SMS message is likely a premium SMS message. The visual indication may include buttons, checkboxes, or other elements that, when selected, cause messaging service module 8 to send the outgoing SMS message, discard the SMS message without sending it, and/or configure computing device 2.

In some instances, the visual indication includes a message requesting whether the selection of whether to send the outgoing SMS message should be "remembered" for the particular application that generated the SMS message. If a user selects the "remember" option, messaging service module 8 may configure computing device 2 such that the next time the sending application generates a new SMS message, messaging service module 8 may not cause UI module 6 to generate a prompt requesting confirmation that the outgoing SMS message should be sent. Instead, messaging service module 8 may intercept the outgoing SMS message and determine, based on stored configuration information, that SMS messages sent from the particular application are to be sent or are to be discarded without requiring confirmation from a user. That is, if a user has configured computing device 2 such that all SMS messages generated by application 12A are to be sent without user confirmation, even if the destination for the outgoing SMS message is a likely premium SMS code, messaging service module 8 may send the outgoing SMS message without causing UI module 6 to output a confirmation prompt. Similarly, if a user has configured computing device 2 such that all SMS messages generated by application 12N are to be blocked (e.g., because application 12N is a malicious application), messaging service module 8 may discard all SMS messages generated by application 12N without requiring confirmation from the user.

Messaging service module 8 may send a message to security module 54 in response to receiving an indication as to whether messaging service module 8 should send or discard an outgoing SMS message. In some instances, if messaging service module 8 discard and outgoing SMS message, messaging service module 8 may send security module 54 and indication that the application that generated the outgoing SMS message (e.g., application 12A) is a potentially malicious application. Security module 54 may maintain a data repository of potentially malicious applications and may exchange information with a service provider. The service provider may aggregate information from a number of different computing devices and may determine that, based on the aggregated information, application 12A is a malicious application. The service provider may send information to other computing devices indicating that application 12A is a malicious application. In turn, the other computing devices may automatically block all outgoing SMS message generated by application 12A. For example, messaging service module 8 may query security module 54 to determine whether the application that generated an outgoing SMS message is a "blacklisted" application (i.e., the application is determined to be a malicious application). In this example, messaging service module 8 may not query codes 10 and may not determine a location of computing device 2. Instead, messaging service module 8 may discard the outgoing SMS message in response to security module 54 indicating that the application is a malicious application. In some examples, security module 54 may be configured to uninstall any applications determined to be malicious applications.

Similarly, security module 54 may maintain a "whitelist" of approved applications that are known to be legitimate applications and not malicious applications. Messaging service module 8 may query security module 54 to determine if the application that generated the outgoing SMS message is a whitelisted application and, if so, send the outgoing SMS message without first checking if the destination is associated with a likely premium SMS code.

Figure 3:
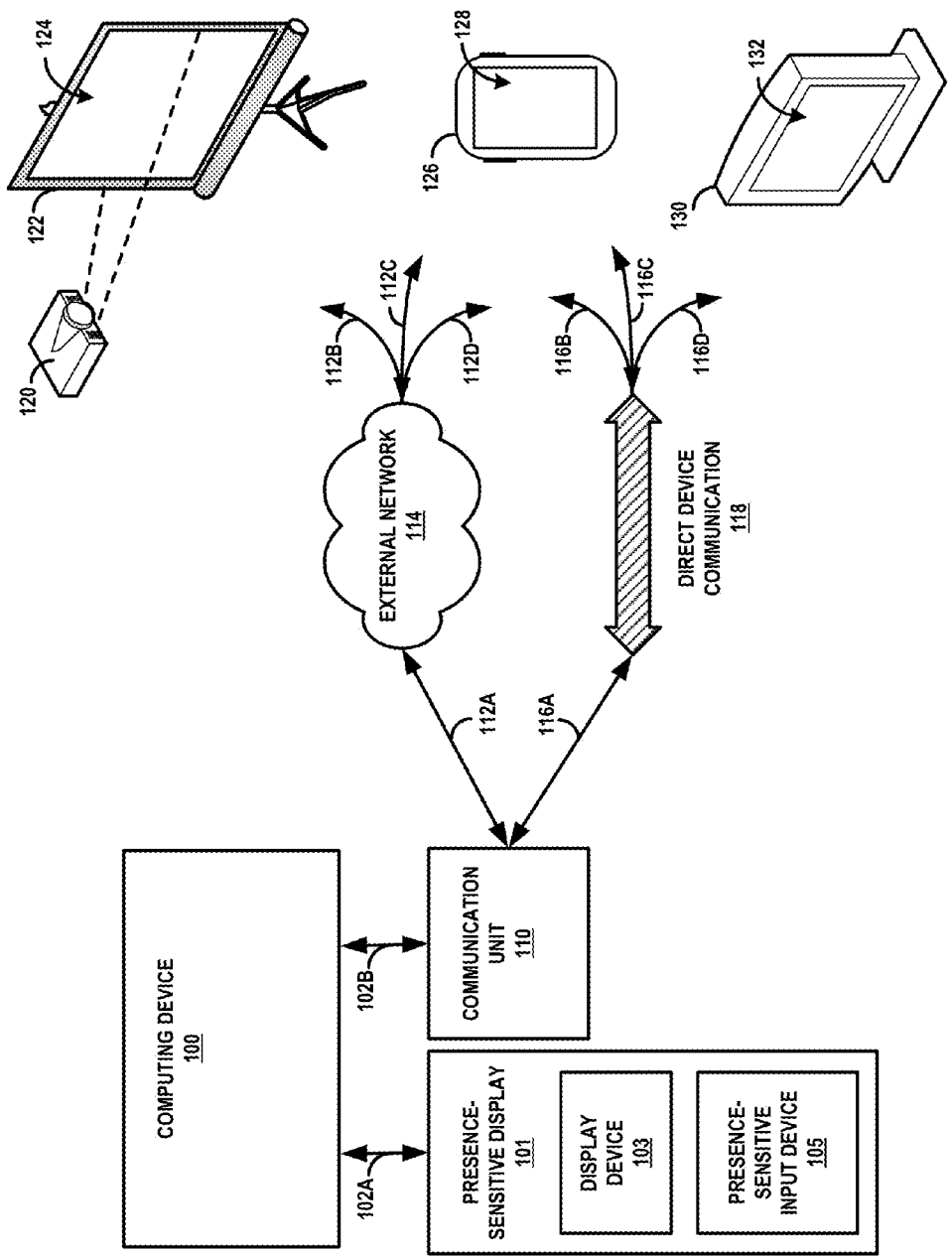
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, tablet device 126, and visual display device 130. Although shown for purposes of example in FIGS. 1 and 2 as a stand-alone computing device 100, a computing device may, generally, be any component or system that includes a processor or other suitable computing environment for executing software instructions and, for example, need not include a presence-sensitive display.

As shown in the example of FIG. 3, computing device 100 may be a processor that includes functionality as described with respect to processor 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously in FIGS. 1-2, computing device 100 may be a portable or mobile device such as mobile phones (including smart phones), laptop computers, etc. In some examples, computing device 100 may be a desktop computers, tablet computers, smart television platforms, cameras, personal digital assistants (PDAs), servers, mainframes, etc.

Presence-sensitive display 101, as shown in FIG. 3, may include display device 103 and presence-sensitive input device 105. Display device 103 may, for example, receive data from computing device 100 and display the graphical content. In some examples, presence-sensitive input device 105 may determine one or more user inputs (e.g., continuous gestures, multi-touch gestures, single-touch gestures, etc.) at presence-sensitive display 101 using capacitive, inductive, and/or optical recognition techniques and send indications of such user input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed.

As shown in FIG. 3, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, and any other suitable devices for displaying graphical content. Projector 120 and project screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 100.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic whiteboard), may receive data from computing device 100 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 100.

FIG. 3 also illustrates tablet device 126 and visual display device 130. Tablet device 126 and visual display device 130 may each include computing and connectivity capabilities. Examples of tablet device 126 may include e-reader devices, convertible notebook devices, hybrid slate devices, etc. Examples of visual display device 130 may include televisions, computer monitors, etc. As shown in FIG. 3, tablet device 126 may include a presence-sensitive display 128. Visual display device 130 may include a presence-sensitive display 132. Presence-sensitive displays 128, 132 may include a subset of functionality or all of the functionality of UI device 4 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, tablet device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, tablet device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, WiFi, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. Computing device 100 may output a graphical element that includes a request for confirmation that an outgoing SMS message should be sent. For instance, computing device 100 may send data that includes a representation of the request to communication unit 110. Communication unit 110 may send the data that includes the representation of the request to visual display device 130 using external network 114. Visual display device 130, in response to receiving the data using external network 114, may cause presence-sensitive display 132 to output the graphical element. In response to a user performing a gesture at presence-sensitive display 132 to select a button, visual display device 130 may send an indication of the gesture to computing device 100 using external network 114. Communication unit 110 may receive the indication of the gesture, and send the indication to computing device 100. Computing device 100 may determine, based on the gesture, whether the SMS message should be sent. In this way, computing device 100 may output the prompt for display at presence-sensitive screen 132, in accordance with techniques of the disclosure.

Figure 4:
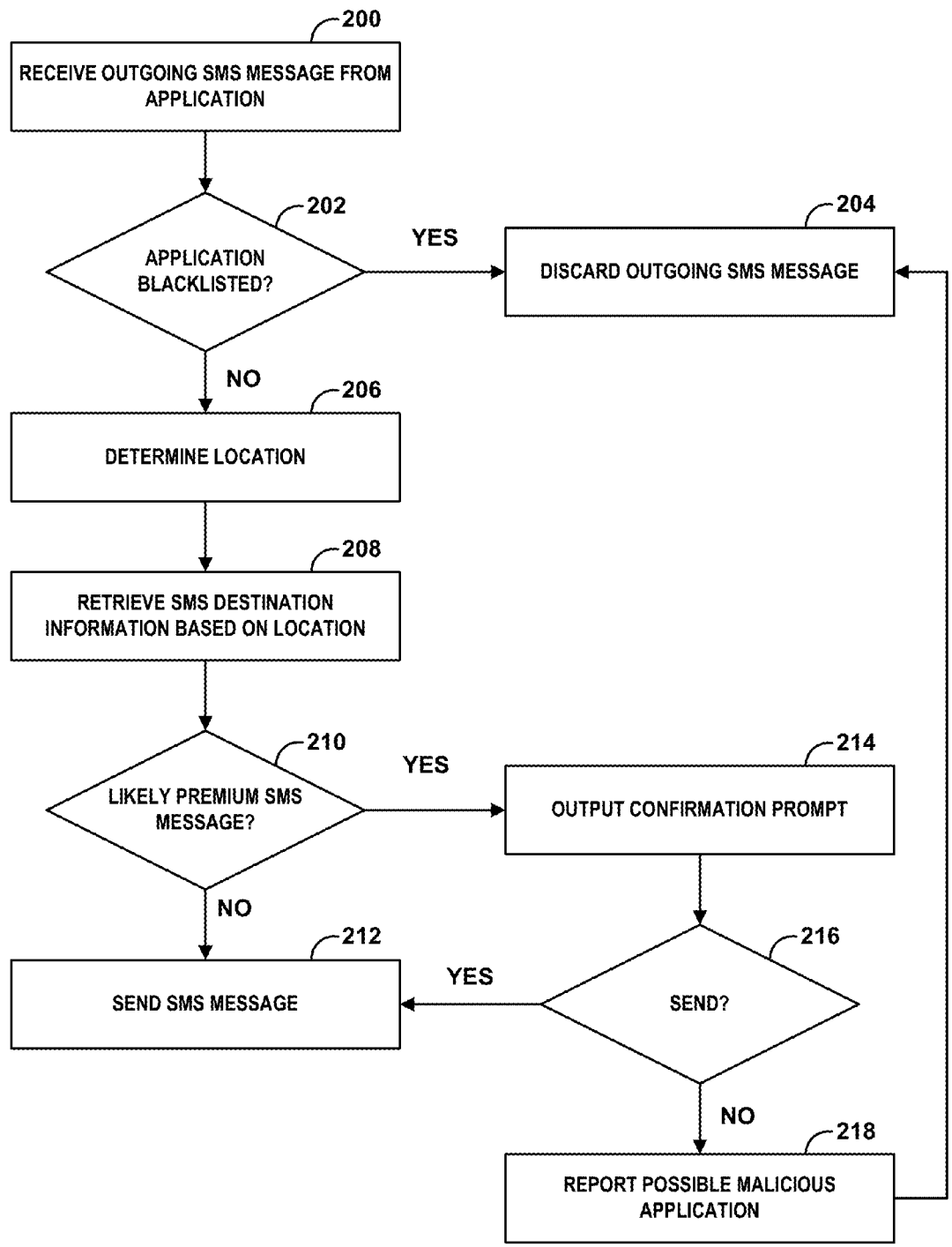
FIG. 4 is a flowchart illustrating example operations of a computing device, in accordance with one or more aspects of the present disclosure.

FIG. 4 is a flowchart illustrating example operations of a computing device, in accordance with one or more aspects of the present disclosure. For purposes of illustration only, the example operations are described below within the context of computing device 2, as shown in FIGS. 1 and 2. The example operations described below may also be performed by computing device 100 as shown in FIG. 3 or by other example computing devices.

Messaging service module 8 of computing device 2 may receive an outgoing SMS message from one of applications 12 (e.g., application 12A) (200). Responsive to receiving the outgoing SMS message, messaging service module 8 may determine if application 12A is blacklisted as being a malicious application (202). To determine whether application 12A is blacklisted, messaging service module 8 may retrieve information from a data repository of computing device 2, may send a message to security module 54, and/or may send a message to a security service (e.g., via communication unit 44). In examples where messaging service module 8 determines that application 12A is blacklisted ("YES" branch of 202), messaging service module 8 discards the outgoing SMS message and does not send the outgoing SMS message (204). In examples where messaging service module 8 determines that application 12A is not blacklisted ("NO" branch of 202), messaging service module 8 may send a message to location module 52 to determine the current location of computing device 2 (206).

Location module 52 may determine the current location of computing device 2 using GPS, network tower triangulation, or other techniques. In some examples, messaging service module 8 and/or location module 52 may retrieve location information from a SIM card of computing device 2. Based on the determined current location of computing device 2, messaging service module 8 may retrieve SMS code information from codes 10 (208). The SMS code information may include one or more SMS codes, location information, and a respective confidence level associated with each of the one or more SMS codes. Messaging service module 8 compares the destination of the outgoing SMS message (e.g., the destination SMS code) to the retrieved SMS codes (210). If the destination SMS code of the outgoing SMS message does not match an SMS code determine to be a likely premium SMS code ("NO" branch of 210), messaging service module 8 may send the message without prompting for confirmation (212).

If the destination SMS code of the outgoing SMS message matches an SMS code determine to be a likely premium SMS code ("YES" branch of 210), messaging service module 8 may cause UI module 6 to output a prompt to confirm that the outgoing SMS message should be sent (214). The prompt may include an indication of the confidence level that the destination SMS code is a likely premium SMS code. For example, if the respective confidence level for the matching SMS code is high, the prompt may indicate that the destination SMS code is a premium SMS code, whereas, if the respective confidence level for the matching SMS code is low, the prompt may indicate that the destination SMS code may be a premium SMS code.

Responsive to receiving an indication of input corresponding to the prompt, messaging service module 8 may determine whether to send the outgoing SMS message (216). If the input corresponds to a confirmation that messaging service module 8 should send the outgoing SMS message ("YES" branch of 216), messaging service module 8 may send the outgoing SMS message (212). If the input corresponds to a confirmation that messaging service module 8 should not send the outgoing SMS message ("NO" branch of 216), messaging service module 8 may send a message to security module 54. Security module 54 may, based on the message, send an indication that application 12A, the application that generated the outgoing SMS message, is a possibly malicious application to a security service (218). Further, when the input corresponds to a confirmation that messaging service module 8 should not send the outgoing SMS message ("NO" branch of 216), messaging service module 8 may discard the outgoing SMS message without sending the outgoing SMS message (204).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, by a mobile computing device, whether an outgoing message is a likely premium message;
   responsive to determining that the outgoing message is the likely premium message, outputting, by the mobile computing device and for display, a prompt for confirmation to send the outgoing message to a likely premium code;
   receiving, by the mobile computing device, an indication of input detected within the prompt for confirmation; and
   selectively sending, by the mobile computing device and based at least in part on the received indication of the user input, the outgoing message to the likely premium code.

2. The method of claim 1, wherein determining whether the outgoing message is a likely premium message comprises:
   determining, by the mobile computing device, a current location of the mobile computing device;
   retrieving, by the mobile computing device and based on the current location of the mobile computing device, one or more destinations; and
   comparing, by the mobile computing device, a destination of the outgoing message to the one or more destinations.

3. The method of claim 1, wherein determining whether the outgoing message is a likely premium message comprises:
   receiving, by the mobile computing device, a plurality of codes identified as premium codes; and
   determining, by the mobile computing device, that a destination of the outgoing message matches at least one of the plurality of codes.

4. The method of claim 3,
   wherein determining whether the outgoing message is a likely premium message further comprises receiving, by the mobile computing device, a respective confidence level for each of the plurality of codes, wherein the respective confidence level indicates a confidence that each of the plurality of codes is likely a premium code, and
   wherein the prompt for confirmation to send the outgoing message includes an indication of the respective confidence level for the code determined to match the destination of the outgoing message.

5. The method of claim 1,
   wherein determining whether the outgoing message is a likely premium message comprises:
      identifying, by the mobile computing device, an application that generated the outgoing message; and
      determining, by the mobile computing device, whether the application is a blacklisted application, and
   wherein selectively sending the outgoing message comprises, responsive to determining that the application is a blacklisted application:
      discarding the received indication of the input; and
      discarding, by the mobile computing device, the outgoing message without sending the outgoing message.

6. The method of claim 1,
   wherein determining whether the outgoing message is a likely premium message comprises:
      identifying, by the mobile computing device, an application that generated the outgoing message; and
      determining, by the mobile computing device, whether the application is a whitelisted application, and
   wherein selectively sending the outgoing message comprises, responsive to determining that the application is a whitelisted application:
      discarding the received indication of the input; and
      sending, by the mobile computing device, the outgoing message.

7. The method of claim 1, wherein selectively sending the outgoing message comprises:
   responsive to determining that the indication of the input corresponds to a confirmation that the outgoing message should be sent, sending, by the mobile computing device, the outgoing message; and
   responsive to determining that the indication of the input corresponds to a confirmation that the outgoing message should not be sent, discarding, by the mobile computing device, the outgoing message without sending the message.

8. The method of claim 1, further comprising:
   determining, by the mobile computing device and based at least in part on the indication of the input, that the outgoing message should not be sent;
   responsive to determining that the outgoing message should not be sent, determining that an application that generated the outgoing message is a possible malicious application; and
   outputting, by the mobile computing device, an indication that the application is a possible malicious application.

9. The method of claim 1, further comprising:
receiving, by the mobile computing device, information for at least one application identified as malicious application; and
responsive to determining that an application stored at the mobile computing device is identified by the information for the at least one application, removing, by the mobile computing device, the application stored at the mobile computing device.

10. The method of claim 1, wherein the outgoing message comprises an outgoing short messaging service message, and wherein the likely premium message comprises a likely premium short messaging service message.

11. A device comprising:
at least one processor;
an messaging service module operable by the at least one processor to determine whether an outgoing message is a likely premium message; and
a user interface module operable by the at least one processor to responsive to determining that outgoing message is the likely premium message, output, for display, a prompt for confirmation to send the outgoing message to a likely premium code, and receive an indication of input detected within the prompt for confirmation,
wherein the messaging service module is further operable by the at least one processor to selectively send, based at least in part on the received indication of the user input, the outgoing message to the likely premium code.

12. The device of claim 11, further comprising:
a data repository that stores information about one or more short codes; and
a location module operable by the at least one processor to determine a current location of the device,
wherein the messaging service is operable by the at least one processor to:
retrieve, from the data repository and based on the current location of the device, one or more codes; and
compare a destination of the outgoing message to the one or more codes.

13. The device of claim 11, wherein the messaging service is operable by the least one processor to:
receive a plurality of codes identified as premium codes; and
determine that a destination of the outgoing message matches at least one of the plurality of codes.

14. The device of claim 13,
wherein the module is operable by the least one processor to receive a respective confidence level for each of the plurality of codes, wherein the respective confidence level indicates a confidence that each of the plurality of codes is likely a premium code, and
wherein the prompt for confirmation to send the outgoing message includes an indication of the respective confidence level for the code determined to match the destination of the outgoing message.

15. The device of claim 11, wherein the messaging service is operable by the least one processor to:
identify an application that generated the outgoing message; and
responsive to determining that the application is a blacklisted application:
discard the received indication of the input; and
discard the outgoing SMS message without sending the outgoing message.

16. The device of claim 11, wherein the messaging service is operable by the least one processor to:
identify an application that generated the outgoing message; and
responsive to determining that the application is a whitelisted application:
discard the received indication of the input; and
send the outgoing message.

17. The device of claim 11, wherein the messaging service is operable by the least one processor to:
responsive to determining that the indication of the input corresponds to a confirmation that the outgoing message should be sent, send the outgoing message; and
responsive to determining that the indication of the input corresponds to a confirmation that the outgoing message should not be sent, discard the outgoing message without sending the message.

18. The device of claim 11, wherein the messaging service is operable by the least one processor to:
determine, based at least in part on the indication of the input, that the outgoing message should not be sent;
responsive to determining that the outgoing message should not be sent, determine that an application that generated the outgoing message is a possible malicious application; and
output an indication that the application is a possible malicious application.

19. The device of claim 11, further comprising a security module operable by the at least one processor to receive information for at least one application identified as malicious application, and responsive to determining that an application stored at the computing device is identified by the information for at least one application, remove the application stored at the computing device.

20. The device of claim 11, wherein the outgoing message comprises an outgoing short messaging service message, and wherein the likely premium message comprises a likely premium short messaging service message.

21. A non-transitory computer-readable storage medium encoded with instructions for causing one or more programmable processors of a computing device to:
determine whether an outgoing message is a likely premium message;
responsive to determining that outgoing message is the likely premium message, output, for display, a prompt for confirmation to send the outgoing message to a likely premium code;
receive an indication of input detected within the prompt for confirmation; and
selectively send, based at least in part on the received indication of the user input, the outgoing message to the likely premium code.

* * * * *